Figure 1:
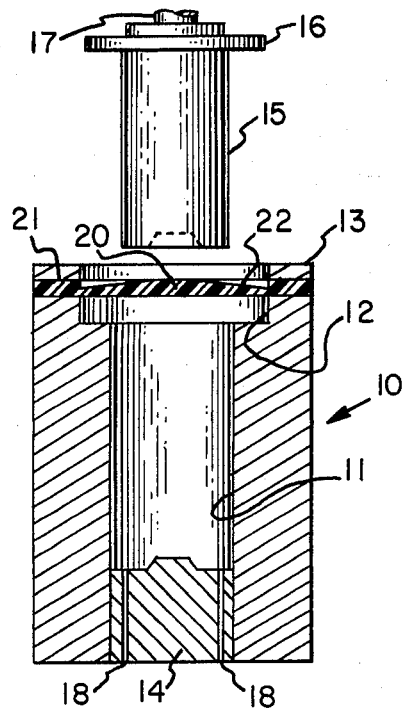

United States Patent [19]

Perkins et al.

[11] 4,419,320
[45] Dec. 6, 1983

[54] NOVEL PROCESS FOR DEEP STRETCH FORMING OF POLYESTERS

[75] Inventors: William G. Perkins, Cuyahoga Falls; Clem B. Shriver, Clinton, both of Ohio

[73] Assignee: The Goodyear Tire & Rubber Company, Akron, Ohio

[21] Appl. No.: 409,770

[22] Filed: Aug. 20, 1982

Related U.S. Application Data

[62] Division of Ser. No. 199,139, Oct. 22, 1980, Pat. No. 4,358,492.

[51] Int. Cl.³ ............................................. B29C 17/03
[52] U.S. Cl. ................................. 264/296; 264/292; 264/322; 264/323
[58] Field of Search ............... 264/292, 199, 139, 296, 264/322, 323

[56] References Cited

U.S. PATENT DOCUMENTS

| | | | |
|---|---|---|---|
| 3,108,881 | 10/1963 | Shaw et al. | 426/412 |
| 3,488,805 | 1/1970 | Biglin et al. | 425/533 |
| 3,496,143 | 2/1970 | Siggel et al. | 264/292 |
| 3,499,786 | 3/1970 | Johnson | 264/322 |
| 3,532,786 | 10/1970 | Coffman | 264/292 |
| 3,577,510 | 5/1971 | Schmitz et al. | 264/292 |
| 3,586,748 | 6/1971 | Ayres | 264/323 |
| 3,716,369 | 2/1973 | Perlman | 426/412 |
| 3,757,718 | 9/1973 | Johnson | 264/323 |
| 3,814,784 | 6/1974 | Wolf | 264/550 |
| 3,865,302 | 2/1975 | Kane | 426/113 |

FOREIGN PATENT DOCUMENTS 8004049 1/1981 Netherlands ............ 428/480

Primary Examiner—James H. Derrington
Attorney, Agent, or Firm—Bruce Henricks

[57] ABSTRACT

A deep stretch forming process for producing low distortion, biaxially oriented, heat set, hermetically sealable hollow containers of high molecular weight saturated linear polyesters comprised of deep stretching an injection molded heated contoured preform into a hollow die by means of a heated forming plunger, annealing or heat setting and then cooling the formed hollow container prior to said containers removal from said die.

9 Claims, 8 Drawing Figures

NOVEL PROCESS FOR DEEP STRETCH FORMING OF POLYESTERS

This is a division of application Ser. No. 199,139 filed Oct. 22, 1980, now U.S. Pat. No. 4,358,492.

TECHNICAL FIELD

The invention relates to a deep stretch forming process for preparing biaxially oriented, heat set, hermetically sealable hollow containers from high molecular weight polyester employing injection molded, contoured preforms of polyester. The invention further relates to formed containers prepared by the process.

BACKGROUND OF THE INVENTION

Polyesters and particularly polyethylene terephthalate are being employed in an increasing array of packaging applications and particularly in the field of food and beverage drink packaging. By way of example such applications include polyester coated paperboard for trays, soft drink beverage bottles, blister packs for the packaging of cold cuts and films for various food wrap applications. However, no matter the growing use of polyesters for such applications, one area in which growth has not yet occurred is that of containers for hot fill food applications. By the term "hot fill" is meant those packaging operations wherein the prepared food is added hot to the package container or where the food is first added to the container and then subjected to a subsequent heating and sterilization operation.

To date most such hot fill food applications employ mainly the familiar metal can or where it is desired that the packaged food or food product be observable containers of glass or thermoplastics such as polypropylene. In the case of the latter, containers can be prepared by means of well-known processes such as, for example, that disclosed in U.S. Pat. No. 3,499,188. In accordance with the teachings of this referenced patent, hollow articles can be provided from a flat sheet blank in a single continuous procedure.

The major drawbacks in using polyesters in such hot fill food application are basically two-fold. First, biaxially oriented polyester containers undergo considerable shrinkage when heated to temperatures at or near their glass transition temperature and second, such containers undergo a change in crystallinity at elevated temperatures such as those encountered in hot fill food applications resulting in their becoming opaque. The present invention provides a process whereby containers for hot fill applications can be prepared from polyesters and particularly polyethylene terephthalate, which exhibit a reduced tendency to shrink, retain their good clarity and impact strength and in addition are of relatively uniform wall and bottom thickness.

DESCRIPTION OF THE INVENTION

The present invention provides a process whereby hollow polyester contains having good clarity and dimensional stability can be prepared for use in hot fill packaging processes. Particularly, the invention of this application provides a deep stretch forming process for preparing biaxially oriented, heat set, hermetically sealable, hollow containers from high molecular weight polyester, said process comprising the steps of (A) injection molding a contoured preform of high molecular weight polyester, said contoured preform consisting of a thick peripheral clamping section and immediately interiorly thereof a tapered central section which radially increases in thickness from about one-fourth the thickness of the peripheral clamping section at a point immediately adjacent said clamping section to about the same thickness as that of the peripheral clamping section at about the center axis of said contoured preform, (B) heating the contoured preform to a temperature ranging from about 10° C. below to about 30° C. above the glass transition temperature of the polyester comprising said contoured blank and clamping said blank exteriorly to and above a hollow die comprising a chamber or cavity having an annular flange forming recess in the upper portion thereof, (C) forcing the tapered central section of the contoured blank through the entrance aperture of and into the chamber or cavity of said hollow die by means of a forming plunger having a flange forming annular ring affixed to the upper portion thereof, said plunger being heated to a temperature ranging from about 10° C. below to about 30° C. above the glass transition temperature of the polyester comprising the contoured preform, (D) increasing the temperature of the forming plunger to a temperature sufficient to induce rapid crystallization of the polyester in the hollow container formed from the contoured preform to anneal or heat set the polyester in said formed container, and (E) cooling the formed container in the hollow die to a temperature below the glass transition temperature of the polyester in the hollow container prior to finally removing the container from said die. More particularly, the invention provides a deep stretch forming process for preparing hollow containers of polyethylene terephthalate, said containers exhibiting good clarity, dimensional stability and impact strength, rendering them useful in hot fill packaging applications. Additionally, the invention relates to formed, biaxially oriented, heat set, hermetically sealable hollow containers prepared from high molecular weight polyesters and particularly high molecular weight polyethylene terephtalate by the process described in greater detail hereinbelow.

Figure 2:
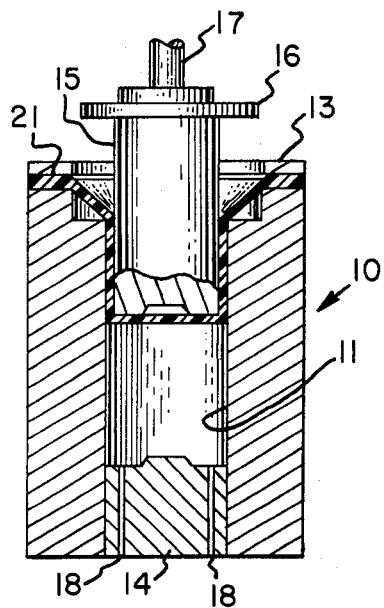
Figure 3:
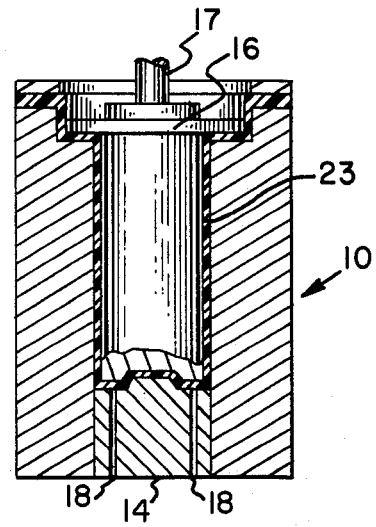

FIGS. 1, 2 and 3 present diagrammatical views of the forming steps of the process of the present invention.

Figure 4:
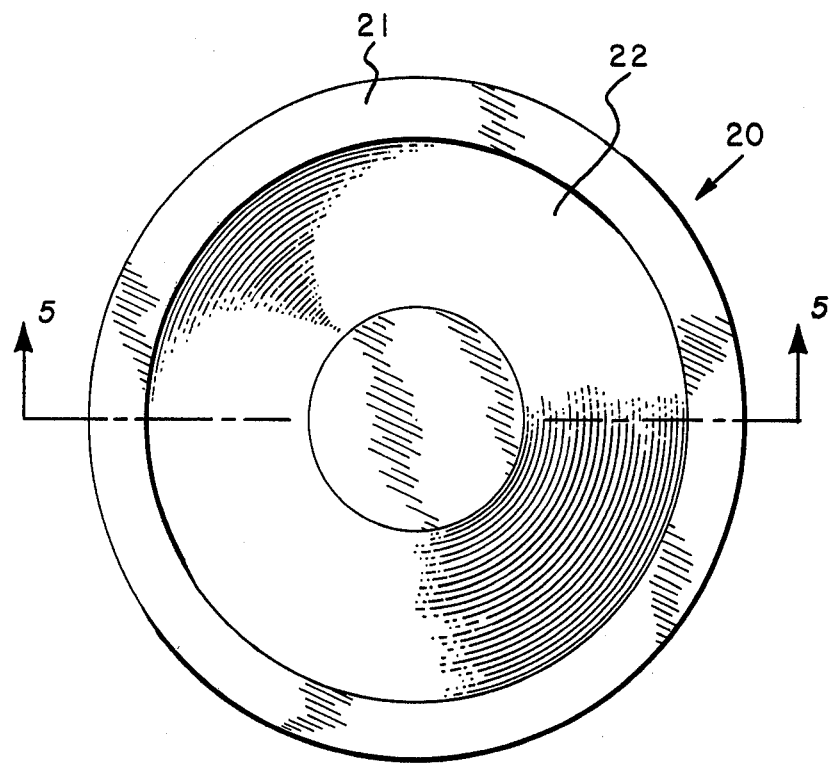
Figure 5:

FIGS. 4 and 5 depict a top view and a cross-sectional view, respectively, of a contoured blank useful in preparing hollow containers in accordance with the process of the present invention.

Referring to FIGS. 1, 2 and 3, injection molded contoured preform 20 of high molecular weight polyester is clamped exteriorly to and above the hollow die 10 having a chamber or cavity 11 and an annular flange forming recess 12 located in the upper portion thereof. The contoured preform 20 is heated to a temperature ranging from about 10° C. below the transition temperature of the polyester to about 30° C. above said temperature and is clamped to said hollow die 10 by its peripheral clamping section 21 by means of clamping ring 13 with sufficient pressure to prevent slippage of the preform 20 during the subsequent steps in the forming process. Having secured the contoured preform 20 to the hollow die 10, the tapered central section 22 of the preform 20, is forced through the entrance aperture and down into chamber or cavity 11 of said hollow die 10 by means of a heated forming plunger 15 having a flange forming annular ring 16 affixed to the upper portion thereof and operated by means of a power piston 17. The bottom of the forming plunger 15 is concave and is of a configuration to match that of the insert 14 having vent passages 18 and comprising the bottom portion of chamber or cavity 11 of the hollow die 10. During the forming step the heated forming plunger 15 is maintained at a temperature ranging from about 5° C. below to about 30° C. above the glass transition temperature of the polyester in the preform 20. Preferably the temperature of the forming plunger 15 will be maintained at a temperature approximately that of the heated preform 20. Once the hollow container has been completely formed and while still in the hollow die 10 the temperature of the formed container 23 is increased to induce rapid crystallization of the polyester therein. For polyethylene terephthalate, the temperature to which the formed container 23 is increased and maintained to effect constrained annealing or heat setting of the polyester in said formed container 23, will range from about 150° C. to about 200° C. Under these conditions a crystallinity ranging from about 25 to about 55 percent will be developed in the oriented polyester comprising the formed container 23. This degree of crystallinity was found to provide the low shrinkage, good clarity and impact strength desired in these containers when hot filled with boiling water. The formed container 23 is then cooled to a temperature below the glass transition temperature of the polyester. For containers produced from polyethylene terephthalate this means cooling the containers to below about 70° C. before removing the container from the hollow die 10. After cooling, the forming plunger 15 and formed container 23 are withdrawn from hollow die 10 and the formed container 23 removed from the forming plunger.

The polyesters useful in forming the biaxially oriented, heat set, hermetically sealable hollow containers prepared in accordance with the process constituting the present invention are saturated linear polyesters derived from $C_6$-$C_{10}$ aromatic dicarboxylic acids or their lower $C_1$-$C_4$ dialkyl ester reactive equivalents and polyalkylene glycols of the general formula HO(CH$_2$)$_n$OH where n is an integer ranging from 2 to 10. The preferred polyester is polyethylene terephthalate which, as is well-known, can be prepared by the reaction of either terephthalic acid or its lower alkyl ester, dimethyl terephthalate, with ethylene glycol and the resultant glycol ester polymerized to high molecular weight product. As used herein the term "high molecular weight" means a polyester having an intrinsic viscosity (I.V.) ranging from about 0.5 to about 1.10 and preferably from about 0.70 to about 1.0 as measured in a 60/40 by volume mixed solvent of phenol/tetrachloroethane at 30° C. The polyesters useful in the present invention will also be characterized by densities of about 1.361 grams per cubic centimeter or less which represents a maximum degree of crystallinity of about 23%.

As used throughout this specification and the appended claims the term "glass transition temperature" means that temperature or temperature range at which a change in slope appears in the volume versus temperature curve for said polymer and defining a temperature region below which the polymer exhibits a glassy characteristic and above which the polymer exhibits a rubbery characteristic. The term "crystallization temperature" means that temperature or temperature range in which a regularly repeating morphology, brought about by a combination of molecular mobility and secondary bonding forces, is induced in a polymer over a molecular distance of at least several hundred angstroms.

The process of the present invention is illustrated by the examples set forth immediately below;

EXAMPLE 1

Figure 6:
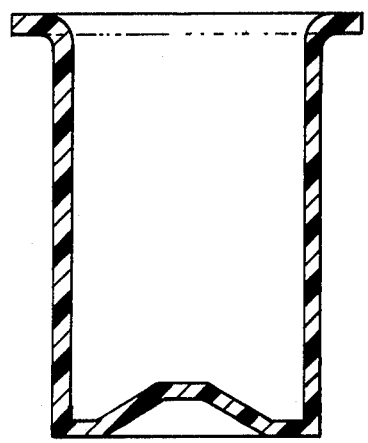

A 12 oz. (0.35 liter) container was produced in accordance with the process of the instant invention as follows: polyethylene terephthalate having an intrinsic viscosity of 0.857 was injection molded into a contoured preform having a cross-sectional configuration, such as shown in FIG. 5. The contoured preform was heated to the temperature of about 70° C. and then clamped exteriorly to and above a hollow die comprised of a cylindrical chamber or cavity having an annular flange forming recess in the upper portion thereof, said die being heated to a temperature of about 70° C. The central section of the heated contoured preform was then forced through the entrance aperture and into the cylindrical chamber or cavity of said die (as depicted in FIG. 2) by means of a forming plunger heated to a temperature of about 80° C. and moving at a rate of 4 inches per minute (10.2 centimeters per minute). When formation of the container was completed the temperature of the forming plunger was raised to 180° C. to affect annealing or heat setting of the formed container. Upon completion of the annealing or heat setting step the formed container was then cooled to a temperature below the glass transition temperature of the polyethylene terephthalate, i.e. about 70° C., and withdrawn from the die and removed from the forming plunger. Measurements conducted on the cylindrical sidewall and bottom sections of the container demonstrated that the material distribution during the forming process to be relatively uniform with the cylindrical sidewall and bottom sections measuring approximately the same thickness. A cross sectional view of this container is depicted in FIG. 6.

EXAMPLE 2

Figure 7:
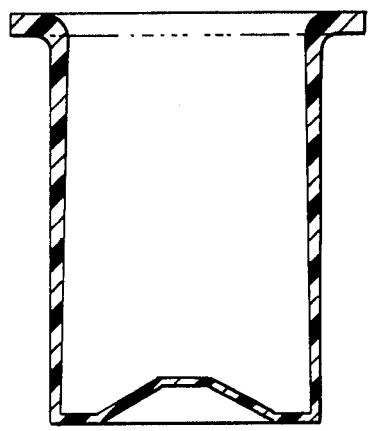

In order to demonstrate the criticality of the use of a contoured preform as a part of the process of the present invention, a second 12 oz. (0.35 liter) container was prepared using the same identical polyester, conditions and apparatus as employed in Example (1) with the exception that the preform used in this Example (2) was an injected molded preform of uniform thickness, i.e. flat. Measurement of the relative thickness of the cylindrical sidewall and bottom sections of the container prepared in this example disclosed a nonuniform distribution of material, i.e. the formed container was characterized by a relatively thick cylindrical sidewall section which tapered down and into a thinner bottom section as depicted in cross-sectional view, FIG. 7.

EXAMPLE 3

Figure 8:
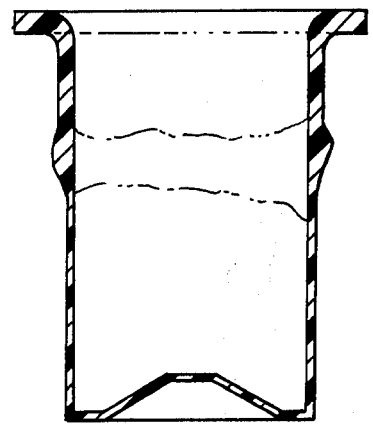

Example 1 was repeated to produce a container in accordance with the process of this invention except that polyethylene terephthalate having an intrinsic viscosity of 0.88 was employed, the temperature of the forming plunger was set at 70° C. and the speed of the forming plunger was adjusted to 8 inches (20.3 centimeters) per minute. Again a formed container having a relatively uniform cylindrical sidewall and bottom section was obtained. For comparison purposes and to demonstrate the criticality of the forming temperature the procedure was repeated in all respects with the exception that the temperature of the forming plunger was equilibrated at 50° C. or approximately 20° C. below the glass transition temperature of the polyethylene terephthalate. On examination, the resulting container was observed not to be comprised of relatively uniform cylindrical sidewall sections, but rather this section exhibited three distinct areas: a thick upper section, a thinner lower section and a thicker band or "draw ring" area separating the upper and lower areas. This effect is illustrated in FIG. 8 which is a cross-sectional view of the container and is typical of the result obtained when forming temperatures below the ranges specified herein are employed.

EXAMPLE 4

Several series of experiments were conducted employing various plunger and preform temperatures and plunger speeds to demonstrate the interrelationship between these variables and to provide guidance in the choice of combination of these variables in order to provide containers of good quality, i.e. uniform sidewall and bottom sections. In all of the experiments an injection molded, contoured preform of polyethylene terephthalate having an intrinsic viscosity of 0.857 was used. The preform had the same cross-sectional contour as that depicted in FIG. 5 and was approximately 0.125 inches (0.32 centimeters) thick in its thickest sections. The conditions employed in the various series are set forth in Table 1 below. It was found that as the ratio of forming plunger temperature to preform temperature increased there was a trend to thicker bases (and correspondingly thinner sidewalls) as a result of employing slower forming speeds. Also, it is apparent from Table 1 that as this ratio decreased there was also a trend to thicker base sections (and correspondingly thinner sidewall section) resulting from the use of fast forming speeds. It can, therefore, be concluded from these various series that when the ratio of plunger temperature to preform temperature approaches 1.0/1.0, containers of relative uniform sidewall and bottom sections can be achieved over a wider range of forming plunger speeds than when ratios either greater or less than 1.0/1.0 are employed.

temperature of 90° C., a preform temperature of 65° C., and a forming speed of 1.0 inch (2.54 centimeters) per minute. The container was annealed in the hollow die at a temperature of 180° C. The finished container possessed relatively uniform cylindrical sidewall and bottom sections and was of good clarity. The mechanical properties of this container were measured and compared to those of an amorphous film of approximately the same thickness as that of the cylindrical sidewalls of the container and prepared by a flat die extrusion process using polyethylene terephtalate of approximately the same intrinsic viscosity as that used in preparing the container. All pertinent data are set forth in Table 2 below.

The meanings of the various abbreviations set forth in Table 2 are as follows: "psi," pounds per square inch; "GPa," gigapascals; "MPa," megapascals; "in-lbf," inch-pounds of force; and "Kg-cmf," kilogram-centimeters of force.

TABLE 2

| | Amorphous Film | Formed Container | |
|---|---|---|---|
| | | Hoop | Axial |
| Tensile Modulus,[a] (GPa) | 140,000(0.98) | 360,000 (2.5) | 770,000 (5.4) |
| Tensile Strength,[a] psi (MPa) | 8,000(56) | 13,000 (91) | 38,000 (266) |
| Elongation at Break,[a] % | 450 | 85 | 34 |
| Gardner Impact Strength,[b] in-lbf (kg-cmf) | 42(48) | >156(179) | |

[a] Determined in accordance with ASTM D-638-68.
[b] Determined using a Gardner falling dart apparatus and adapted from British Standard 2782-306B. Test specimen thickness was 0.048 ± 0.005 centimeters.

The hollow containers capable of being produced by the process of the present invention are biaxially oriented, heat set and hermetically sealable and are prepared from injection molded, contoured preforms of high molecular weight, saturated, linear polyesters characterized by intrinsic viscosities ranging from about 0.50 to about 1.10 as measured in a 60/40 by volume

TABLE 1

| Series No. | Plunger Temp °C. | Preform Temp °C. | Ratio of Plunger Temp/ Preform Temp | Forming Rate Inches/Min. | Average Bottom Thickness-mils |
|---|---|---|---|---|---|
| 1 | 60 | 80 | | 16 | 21.0 |
| | 60 | 80 | 0.75 | 3 | 9.5 |
| | 60 | 80 | | 1 | 7.0 |
| 2 | 70 | 80 | | 16 | 20.5 |
| | 70 | 80 | 0.875 | 4 | 14.4 |
| | 70 | 80 | | .75 | 10.0 |
| 3 | 80 | 80 | | 16 | 9.0 |
| | 80 | 80 | 1.0 | 4 | 10.5 |
| | 80 | 80 | | 1 | 7.0 |
| 4 | 70 | 70 | | 16 | 9.0 |
| | 70 | 70 | 1.0 | 3 | 9.0 |
| | 70 | 70 | | .75 | 11.0 |
| 5 | 80 | 70 | | 16 | 8.5 |
| | 80 | 70 | 1.14 | 3 | 7.5 |
| | 80 | 70 | | 1.5 | 10.0 |
| 6 | 80 | 60 | | 16 | 9.0 |
| | 80 | 60 | 1.33 | 3 | 8.5 |
| | 80 | 60 | | 1 | 11.0 |

EXAMPLE 5

To demonstrate the benefit of deep stretch forming, i.e. improvement in mechanical properties resulting from biaxial orientation, a container was prepared from a contoured preform of polyethylene terephthalate having an intrinsic viscosity of 0.857. The conditions used in preparing the container included a forming plunger mixed solvent of phenol and tetrachloroethane at 30° C. and densities of about 1.361 grams per cubic centimeter or less. Preferably the containers are produced from injection molded contoured preforms of polyethylene terephthalate having intrinsic viscosities ranging from about 0.70 to about 1.0.

Generally, the ratio of the weight in grams of the polyester in the containers to the inside volume of the article in cubic centimeters will range from about 0.1:1.0 to about 0.01:1. During the forming of the container, the container will be stretched from about 4.0 to about 6.0 times in the axial direction and from about 2.0 to about 3.0 in the hoop direction of the container. This degree of stretching not only provides the desired biaxial orientation of the container but as a result thereof provides for container cylindrical sidewalls having axial tensile strengths ranging from about $2.0 \times 10^4$ psi to about $5 \times 10^4$ psi (140 MPa to 350 MPa) hoop tensile strengths ranging from about $1.0 \times 10^4$ to about $2.0 \times 10^4$ psi (70 MPa to 140 MPa), axial tensile modulus ranging from $5.0 \times 10^5$ to about $1.0 \times 10^6$ psi (3.5 GPa to 7.0 GPa) and a hoop tensile modulus ranging from about $2.0 \times 10^5$ to about $5.0 \times 10^5$ psi (1.4 GPa to 3.5 GPa). In addition, the container exhibits a Gardner impact strength of at least 100 in-lbf (115 kg-cmf).

The density of the polyester in the cylindrical sidewall and bottom sections of the containers produced by the process constituting the present invention will range from about 1.364 to about 1.400 which represents a degree of crystallinity ranging from about 25 to about 55 percent. As noted hereinabove these degrees of crystallinity provide for containers exhibiting minimal volume shrinkage, i.e. 3.0 percent or less, when hot filled with boiling water (100° C.).

In addition, even with the high degree of crystallinity in the cylindrical sidewall and bottom sections of the containers produced by the instant process the containers possess good clarity and remain clear when subjected to a boiling water treatment. This result is surprising in light of the teachings in U.S. Pat. No. 3,745,150 to the effect that crystalline shaped articles are opaque.

While certain representative embodiments and details have been shown for the purpose of illustrating the invention, it will be apparent to those skilled in this art that various changes and modifications may be made therein without departing from the spirit or scope of the invention.

We claim:

1. A deep stretch forming process for preparing biaxially oriented, heat set, hermetically sealable, hollow containers with cylindrical sidewall and bottom sections measuring approximately the same thickness, from high molecular weight polyester, said process comprising the steps of
    (A) injection molding a contoured preform of high molecular weight polyester, said contoured preform consisting of a thick peripheral clamping section and immediately interiorly thereof a tapered central section which radially increases in thickness from about one-fourth the thickness of the peripheral clamping section at a point immediately adjacent to said clamping section to about the same thickness as that of the peripheral clamping section at about the center axis of said contoured preform;
    (B) heatng the contoured preform at a temperature ranging from about 10° C. below to about 30° C. above the glass transition temperature of the polyester comprising said contoured preform and clamping said preform exteriorly to and above a hollow die comprising a chamber or cavity having an annular flange forming recess in the upper portion thereof;
    (C) forcing the tapered central section of the contoured preform through the entrance aperture of and into the chamber or cavity of said hollow die by means of a forming plunger having a flange forming annular ring affixed to the upper portion thereof, said plunger being heated to a temperature ranging from about 10° C. below to about 30° C. above the glass transition temperature of the polyester comprising the contoured preform;
    (D) increasing the temperature of the forming plunger to a temperature sufficient to induce rapid crystallization of the polyester in the hollow container formed from the contoured preform to anneal or heat set the polyester in the formed container; and
    (E) cooling the formed container in the hollow die to a temperature below the glass transition temperature of the polyester in the hollow container prior to finally removing the container from the hollow die.

2. The process of claim 1 wherein the injection molded contoured preform is heated to a temperature ranging from about 60° C. to about 100° C.

3. The process of claim 1 wherein the forming plunger used to force the tapered central section of the heated contoured preform through the entrance aperture of and into the cavity or chamber of the hollow die is heated to a temperature ranging from about 60° C. to about 100° C.

4. The process of claim 1 wherein the temperature of the forming plunger is increased to a temperature ranging from about 150° C. to about 200° C. to anneal or heat set the polyester in the hollow container formed from the contoured preform.

5. The process of claim 1 wherein the formed container is cooled in the hollow die to a temperature below the glass transition temperature of the polyester in said container.

6. The process of claim 1 wherein the high molecular weight polyester employed in the process is polyethylene terephthalate.

7. The process of claim 6 wherein the polyethylene terephthalate has a density of 1.361 grams per cubic centimeter or less and an intrinsic viscosity ranging from about 0.5 to 1.10 as measured in a 60/40 mixed solvent of phenol and tetrachloroethane at 30° C.

8. The process of claim 7 wherein the intrinsic viscosity of the polyethylene terephthalate ranges from about 0.70 to about 1.0.

9. A deep stretch forming process for preparing biaxially oriented, heat set, hermetically sealable, hollow containers with cylindrical sidewall and bottom sections measuring approximately the same thickness, from high molecular weight polyester, said process comprising the steps of
    (A) heating a contoured preform of high molecular weight polyester, said contoured preform consisting of a thick peripheral clamping section and immediately interiorly thereof a tapered central section which radially increases in thickness from about one-fourth the thickness of the peripheral clamping section at a point immediately adjacent to said clamping section to about the same thickness as that of the peripheral clamping section at about the center axis of said contoured preform wherein said heating is at a temperature ranging from about 10° C. below to about 30° C. above the glass transition temperature of the polyester comprising said contoured preform and clamping said preform exteriorly to and above a hollow die comprising a chamber or cavity having an annular flange forming recess in the upper portion thereof;

(B) forcing the tapered central section of the contoured preform through the entrance aperature of and into the chamber or cavity of said hollow die by means of a forming plunger having a flange forming annular ring affixed to the upper portion thereof, said plunger being heated to a temperature ranging from about 10° C. below to about 30° C. above the glass transition temperature of the polyester comprising the contoured preform;

(C) increasing the temperature of the polyester in the hollow container to induce rapid crystallization to anneal or heat set said polyester.

* * * * *